(12) United States Patent
Ganguli et al.

(10) Patent No.: US 8,560,149 B1
(45) Date of Patent: Oct. 15, 2013

(54) SYSTEMS AND METHODS FOR TAKEOFF ASSISTANCE AND ANALYSIS

(71) Applicant: Honeywell International Inc., Morristown, NJ (US)

(72) Inventors: Subhabrata Ganguli, Plymouth, MN (US); Kevin D. Vanderwerf, Oro Valley, AZ (US); Kent Stange, Phoenix, AZ (US); Scot Griffith, Glendale, AZ (US)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 13/623,850

(22) Filed: Sep. 20, 2012

(51) Int. Cl.
  *G06F 19/00* (2011.01)
(52) U.S. Cl.
  USPC .......................................................... 701/15
(58) Field of Classification Search
  USPC .................................................. 701/15, 510
  See application file for complete search history.

(56) References Cited

U.S. PATENT DOCUMENTS

| 8,016,366 B2 | 9/2011 | Rudd, III |
| 8,073,584 B2 | 12/2011 | Marty et al. |
| 2011/0040431 A1* | 2/2011 | Griffith et al. ................... 701/15 |

OTHER PUBLICATIONS

Amelsberg, "Wake Vortex Severity Criteria for Takeoff and Departure", Jun. 2, 2010, pp. 1-25, Publisher: Berlin Institute of Technology.
"About TMS: Autopilots Explained", "http://www.technicalmarine.com/pages/autopilots-explained accessed Apr. 13, 2012", 2012, pp. 1-2.
Berndt et al, "Progress on and Usage of the Open Source Flight Dynamics Model Software Library, JSBSim", Aug. 2009, pp. 1-17.
"The CREDOS Project: Trajectory models for take-off and departure D3-1", Jul. 30, 2007, pp. 1-100.
"EASy II Upgrades for Falcon Flight Decks", Sep. 2009, pp. 1-4.
Johnson et al, "Generic Pilot and Flight Control Model for Use in Simulation Studies", Aug. 2002, pp. 1-8, Publisher: Georgia Institute of Technology.
"Honeywell Runway Safety", "https://honeywellrunwaysafety.com/smartrunway.php accessed Apr. 13, 2012", 2011, pp. 1-2.

(Continued)

*Primary Examiner* — Mary Cheung
*Assistant Examiner* — Michael D Lang
(74) *Attorney, Agent, or Firm* — Fogg & Powers LLC

(57) ABSTRACT

Systems and methods for takeoff assistance and analysis are provided. In one embodiment, a takeoff ground roll assist system for an aircraft comprises: a runway centerline estimator, wherein the runway centerline estimator generates a virtual runway centerline estimate for a runway based on coordinates for the runway from a runway database; an (Inertial Navigation System) INS Output Filter and Fault Detector wherein the filtering of navigation measurements from an on-board inertial navigation system, using a runway centerline start point as established by activation of a pilot operated start point sensor occurs, a centerline tracking estimator coupled to receive a filtered output of the on-board inertial navigation system from the INS output filter and fault detector and to receive the virtual centerline estimate from the runway centerline estimator, wherein the centerline tracking estimator generates a centerline tracking feedback signal that varies as a function of a difference between an aircraft look-ahead point and the virtual runway centerline; and a takeoff criteria evaluator coupled to the runway centerline estimator and the centerline tracking estimator, wherein the takeoff criteria evaluator estimates a lateral deviation between the aircraft and an actual runway centerline for the runway based on an estimated navigation error component, the runway database error component, and a centerline tracking error component.

20 Claims, 14 Drawing Sheets

(56) References Cited

OTHER PUBLICATIONS

"Runway Awareness and Advisory System (RAAS)", "http://www.skybrary.aero/index.php/Runway_Awareness_and_Advisory accessed Apr. 13, 2012", , pp. 1-3.

"SmartRunway and SmartLanding", "http://www51.honeywell.com/aero/Products-Services/Avionics-Electronic accessed Apr. 13, 2012", , p. 1.

Zhang et al., "Mathematical Models for Human Pilot Maneuvers in Aircraft Flight Simulation", "ASME 2009 International Mechanical Engineering Congress and Exposition", Nov. 2009.

* cited by examiner

Data for Boeing 747-100 On Ground Model

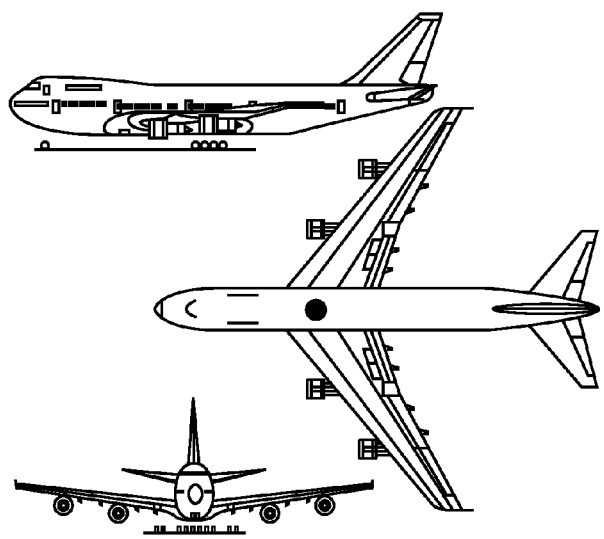

| | | | |
|---|---|---|---|
| CL | = | 1.0 | |
| CD | = | 0.046 | |

Aerodynamic Coefficients

| | | | | | | | | |
|---|---|---|---|---|---|---|---|---|
| Clb | = | -0.221 | Cnb | = | 0.15 | Cyb | = | -0.96 |
| Clp | = | -0.45 | Cnp | = | -0.121 | Cyp | = | 0 |
| Clr | = | 0.101 | Cnr | = | -0.30 | Cyr | = | 0.3 |
| Clda | = | 0.0461 | Cnda | = | 0.0064 | Cyda | = | 0 |
| Cldr | = | 0.007 | Cndr | = | -0.109 | Cydr | = | 0.175 |

Mass Properties, Geometry

| | | | |
|---|---|---|---|
| m | = | 22785 | slug |
| W | = | 733000 | lb |
| Ixx | = | 2.10E+07 | slug-ft^2 |
| Iyy | = | 3.81E+07 | slug-ft^2 |
| Izz | = | 5.72E+07 | slug-ft^2 |
| Ixz | = | 0 | slug-ft^2 |
| Ixy | = | 0 | slug-ft^2 |
| Iyz | = | 0 | slug-ft^2 |
| S | = | 5500 | ft/s^2 |
| Cbar | = | 27.3 | ft |
| b | = | 196 | ft |
| dNW | = | 76.8 | ft |
| dMG | = | 5.3 | ft |

Tire Forces

| | | | |
|---|---|---|---|
| mu_friction | = | 0.02 | - |
| gammaNW | = | 7.2 | 1/rad |
| gammaMG | = | 7.2 | 1/rad |

Environment, Miscellaneous

| | | | |
|---|---|---|---|
| rho | = | 0.002378 | slug/ft^3 |
| JY2dr | = | 1 | deg/deg |
| JY2dtl | = | -1/10 | deg/deg |
| Vliftoff | = | 274.5 | fps |
| | | (160 knots) | |

FIG. 6

SYSTEMS AND METHODS FOR TAKEOFF ASSISTANCE AND ANALYSIS

BACKGROUND

Takeoff guidance systems provide command information, as lateral guidance, which if followed by the pilot, will maintain the airplane on the runway during the takeoff ground roll from acceleration to liftoff or, if necessary during a deceleration to a stop during a rejected takeoff. Heads up displays (HUDs) are often used in conjunction with an airport's instrument landing system (ILS) to function as a takeoff guidance system that assists a pilot in aligning their aircraft with the airport runway. For assisting takeoff, ILS signals can be accurate enough to guide a pilot down the centerline of the runway when used in combination with HUDs. Using signals from an ILS, the pilot can track the position of the aircraft on the runway. Using HUD symbology, the pilot can maneuver the aircraft to keep it on the centerline of the runway during takeoff. Commonly, navigation assistance signals, such as from an ILS, are utilized in low visibility conditions where the pilot's ability to visually follow the centerline of the runway may be impaired. However, to be capable of assisting in takeoff, as commonly known in the art, an ILS needs to produce a high fidelity signal in order for the ILS localizer beam to be of sufficient quality to support low visibility take offs. Many airports lack an ILS having sufficient fidelity to assist in takeoff, or lack on ILS all together. As a result, aircraft at such airports are restricted from taking off during low visibility conditions. Some recent takeoff guidance systems have also incorporated other off-board signals such as Global Positioning System (GPS) signals as navigation aids for takeoff. These signals also have limitations in fidelity and reliability such that their use as a primary means of navigation does not satisfy most availability and safety concerns during low visibility take offs.

For the reasons stated above and for other reasons stated below which will become apparent to those skilled in the art upon reading and understanding the specification, there is a need in the art for improved systems and methods for low visibility takeoff assistance and analysis.

SUMMARY

The Embodiments of the present invention provide methods and systems for low visibility takeoff assistance and analysis and will be understood by reading and studying the following specification.

Systems and methods for takeoff assistance and analysis are provided. In one embodiment, a takeoff ground roll assist system for an aircraft comprises: a runway centerline estimator, wherein the runway centerline estimator generates a virtual runway centerline output for a runway based on coordinates for the runway from a runway database; an Inertial Navigation System (INS) Output Filter and Fault Detector wherein the filtering and assessing the fault status of onboard sensors occurs, a centerline tracking estimator coupled to the filtered output of the on-board inertial navigation system and the runway centerline estimator, wherein the centerline tracking estimator generates a centerline tracking feedback signal that varies as a function of a difference between an aircraft look-ahead point and the virtual runway centerline; and a takeoff criteria evaluator coupled to the runway centerline estimator, the centerline tracking estimator and the INS output filter and fault detector, wherein the takeoff criteria evaluator estimates a lateral deviation between the aircraft center of gravity and an actual runway centerline for the runway based on an estimated navigation error component, a runway database error component, and a centerline tracking error component.

DRAWINGS

Embodiments of the present invention can be more easily understood and further advantages and uses thereof more readily apparent, when considered in view of the description of the preferred embodiments and the following figures in which:

FIG. 6 is diagram illustrating parameters of an Aircraft Ground Dynamics Model of one embodiment of the present invention;

In accordance with common practice, the various described features are not drawn to scale but are drawn to emphasize features relevant to the present invention. Reference characters denote like elements throughout figures and text.

DETAILED DESCRIPTION

Figure 1:
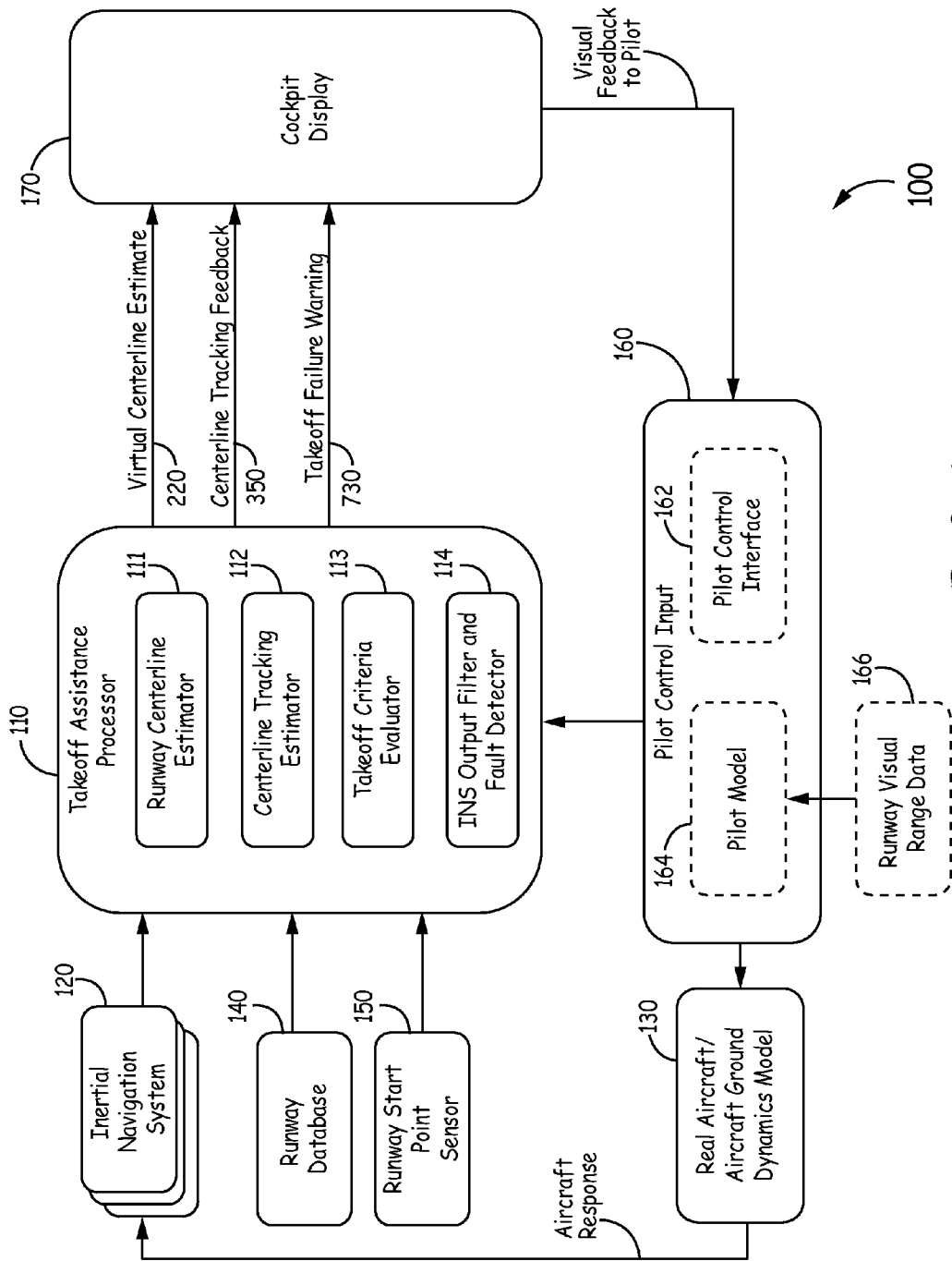
FIG. 1 is a block diagram illustrating a virtual centerline takeoff assist system of one embodiment of the present invention.

In the following detailed description, reference is made to the accompanying drawings that form a part hereof, and in which is shown by way of specific illustrative embodiments in which the invention may be practiced. These embodiments are described in sufficient detail to enable those skilled in the art to practice the invention, and it is to be understood that other embodiments may be utilized and that logical, mechanical and electrical changes may be made without departing from the scope of the present invention. The following detailed description is, therefore, not to be taken in a limiting sense.

Embodiments of the present invention provide systems and methods for analyzing and enhancing the takeoff capability of an aircraft. This is accomplished in part through estimates of worst-case cross track error or lateral deviation for an aircraft taking off from a runway under degraded visibility conditions. No assistance from ground based navigation assistance signals, such as an instrument landing system (ILS) signals, or other off-board navigation assistance signals, such as global positioning system (GPS) signals are needed. In some embodiments of the present invention, estimates are generated for an accurate path that represents the centerline of a runway. From those estimates, a cockpit display such as a Heads-up Display (HUD), for example, can be used to guide a pilot down a runway for takeoff. An error analysis is performed to arrive at an estimate of where the aircraft is with respect to the runway centerline. Ideally, when an aircraft starts at the beginning of a runway and is aligned with the centerline of the runway, if the aircraft is kept straight while rolling down the runway, the aircraft should follow the centerline. Reality differs from the ideal because of errors, as discussed below. Embodiments described herein perform an analysis to determine the bounds of these errors. Where it can be determined that the errors are sufficiently bounded, aircraft takeoff may be permitted.

In order to eliminate dependence on ILS or other off-board navigation signals, embodiments of the present invention utilize other on-board resources that provide the information which may be used to define where the centerline is located on a runway. Those other on-board resources include the inertial navigation system/inertial reference system and databases that contain runway information (for example, where a flight management system includes a database that contains detailed information on runways including runway length, dimensions, and coordinates). The other on-board resources include pilot observations and inputs. For example, when a pilot taxis to the beginning of a runway for takeoff, the pilot can provide input to the system based on visual observation. For example, the pilot can identify when the aircraft has been roughly positioned at the start of the runway and is roughly aligned with the runway centerline.

From these resources, a virtual centerline for the runway can be computed and the aircraft's progress in tracking the centerline during a takeoff can be estimated. Further, in some embodiments, these resources may be utilized to provide an analysis of the aircrafts capability to takeoff within permitted thresholds under reduced runway visibility conditions. As will be described in greater detail below, in alternate implementations, embodiments of the present invention may be used to provide real-time feedback to pilots initiating takeoff, and can also be used for certifying aircraft for certain reduced runway visibility takeoff scenarios.

FIG. 1 is a block diagram illustrating a takeoff ground roll assist system 100 for analyzing aircraft centerline tracking of one embodiment of the present invention. System 100 comprises a takeoff assistance processor 110 coupled to an inertial navigation system 120, a real aircraft/aircraft ground dynamics model 130, a runway database 140, and a runway start point sensor 150. Takeoff assistance processor 110 comprises a runway centerline estimator 111, a centerline tracking estimator 112, a takeoff criteria evaluator 113, and an Inertial Navigation System (INS) Output Filter and Fault Detector 114 each discussed in greater detail below. System 100 receives control instructions from a pilot control input 160 which in alternate embodiments may be realized by a pilot interface device 162 (such as a pilot operated tiller, sidestick or column/wheel), or a pilot model 164 that simulates pilot input based on a mathematical pilot model. The pilot model 164, in some embodiments, may be augmented by runway visual range data 166, which tunes the pilot model 164 to account for reduced visual data available to the pilot under reduced runway visual range conditions. In still other embodiments, a pilot model 164 and a pilot interface device 162 both provide information used by takeoff assistance processor 110.

In FIG. 1, a cockpit display 170 is also coupled to takeoff assistance processor 110. Cockpit display 170 receives data from takeoff assistance processor 110. In one embodiment, cockpit display 170 receives virtual centerline estimate 220, centerline tracking feedback 350, and takeoff failure warning 730. Cockpit display 170 functions to visually display information to a pilot such as a visual indication of an estimated virtual centerline, a visual indication of centerline tracking, and takeoff warnings based on the data from takeoff assistance processor 110. Cockpit display 170 may be implemented using a heads down display, such as a screen viewable within the cockpit. In other embodiments, cockpit display 170 is implemented as a heads-up display that projects images in front of the pilot that the pilot may view while looking forward through the cockpit windshield windows.

Figure 2A:
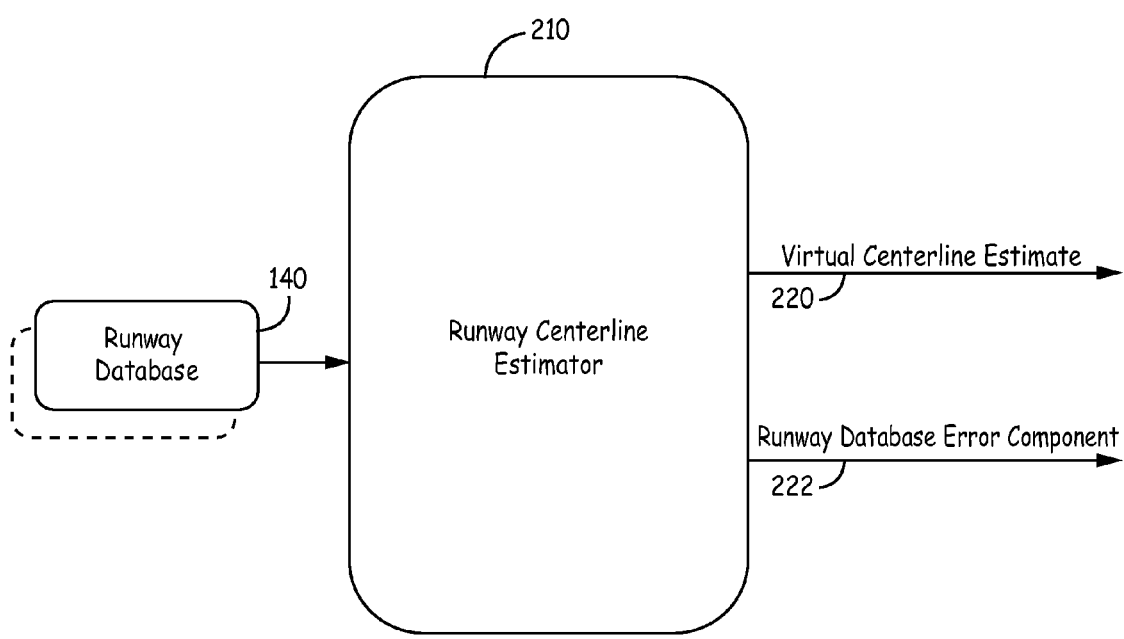
FIGS. 2A-2C are diagrams illustrating a runway centerline estimator of one embodiment of the present invention.
Figure 2B:
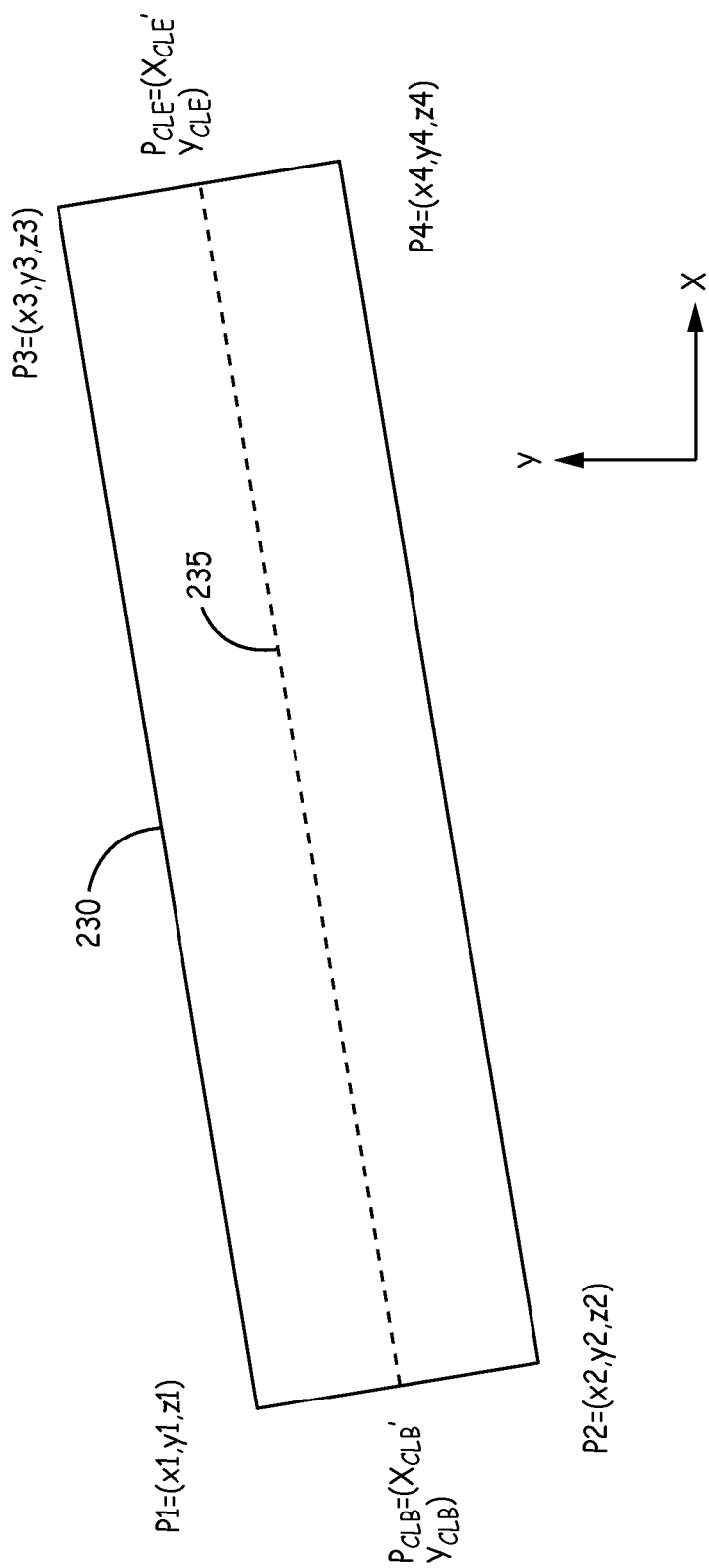
Figure 2C:
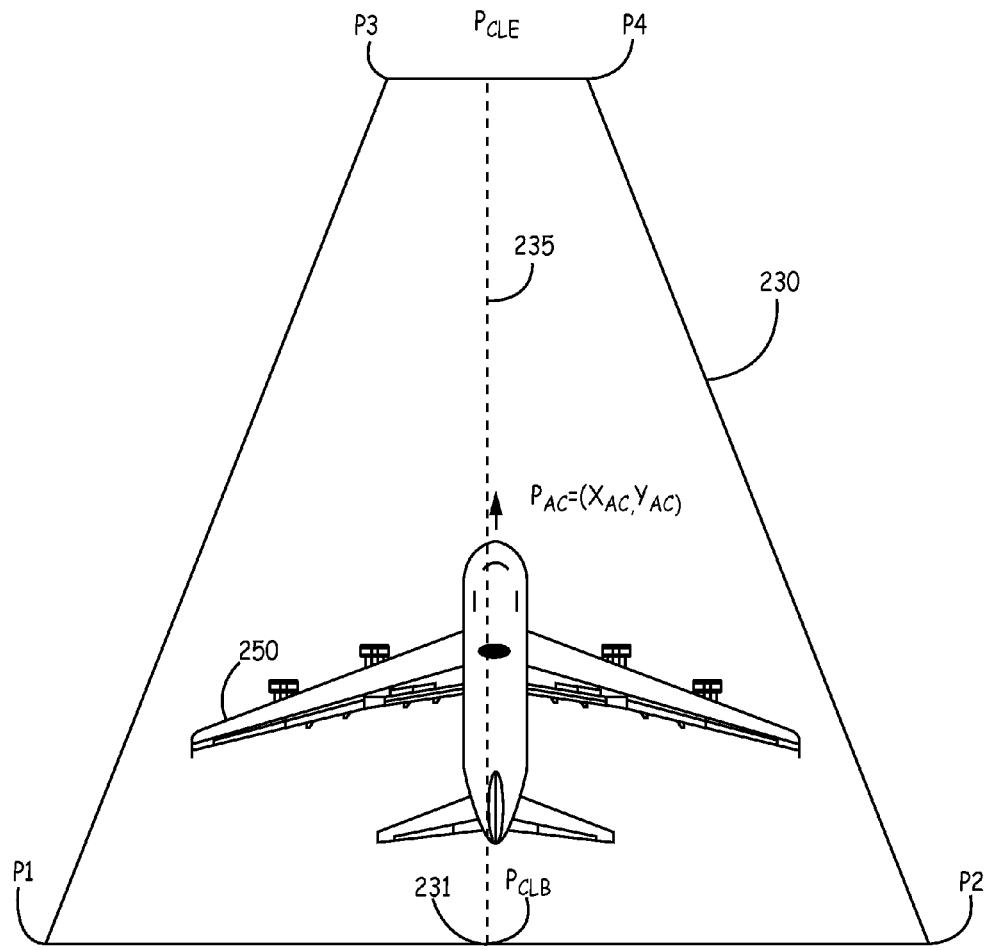

FIGS. 2A, 2B and 2C are diagrams illustrating a runway centerline estimator 210 such as runway centerline estimator 111 implemented within takeoff assistance processor 110. Using data supplied by a runway database 140 runway centerline estimator 210 generates an output 220 representing a virtual centerline estimate, and an output 222 representing a runway database error estimate (e.g., caused by limited resolution of the runway data). In one embodiment redundant (e.g. FMS 1 and FMS 2) or independent (e.g. FMS and Enhanced Ground Proximity Sensor) runway databases may be input and compared by the runway centerline estimator 210 to reduce the probability of corrupted or faulted runway information impacting the integrity of the virtual centerline estimate 220. In one embodiment, the virtual centerline estimate output 220 is provided to cockpit display 170 as a guidance cue. In one embodiment, runway centerline estimator 210 retrieves runway information from runway database 140 for the runway from which takeoff is planned. In some embodiments, runway database 140 includes more than one database. The runway information provides runway centerline estimator 210 with runway dimensions, location and layout information. Referring to FIG. 2B, in one embodiment, runway centerline estimator 210 retrieves from runway database 140 coordinates for various points that define the layout of a runway 230. For example, in one embodiment, runway database 140 provides coordinate points P1, P2, P3 and P4 which define the four corners of runway 230 in three dimensions. From the coordinate points P1, P2, P3 and P4, a centerline point for the beginning of the runway (shown as $P_{CLB}$) and the end of the runway (shown as $P_{CLE}$) may be calculated. Alternatively, the runway database 140 may provide centerline points $P_{CLB}$ and $P_{CLE}$ directly. With these centerline points determined, an equation that defines a virtual runway centerline 235 can be generated so that the centerline's coordinates for any position along the length of runway 230 can be readily determined. For example, in one implementation, an equation that defines a virtual runway centerline 235 may be expressed as a standard linear equation such as $$Y=((Y_{CLE}-Y_{CLB})/(X_{CLE}-X_{CLB}))X+Y_{CLB}$$

for use with a rectangular grid coordinate system as indicated on FIG. 2B. As would be appreciated by one of ordinary skill in the art upon reading this disclosure, many different expressions/algorithms are available to model a runway centerline. As such, in other implementations, other mathematical expressions/algorithms may be used for defining virtual runway centerline 235.

As illustrated in FIG. 2C, to calibrate inertial navigation system 120 and align the virtual runway centerline 235 with respect to the center of gravity of aircraft 250, a rough visual estimation is performed by having the pilot maneuver the aircraft 250 to a position on runway 230 that the pilot perceives as being the centerline point 231 for an actual runway centerline at the beginning of runway 230. In this position, aircraft 250 should be located approximately at $P_{CLB}$, the centerline point for the beginning of the runway as estimated by runway centerline estimator 210. The pilot will then activate the runway start point sensor 150 to perform output filtering and fault detection of the INS 120 by INS Output Filter and Fault Detector 114 of FIG. 1. This pilot action accomplishes two tasks. First, it informs the takeoff assistance processor 110 that aircraft 250 is presently located at the coordinates for $P_{CLB}$. Any subsequent accelerations or changes in aircraft direction detected by INS 120 may then be tracked with respect to $P_{CLB}$. Further, the absolute position on runway 230 as well as the direction and speed of travel of aircraft 250 may be tracked.

Additionally, when aircraft 250 taxis from its gate position to the runway 230, INS 120 will build up navigation errors. Performing the runway start point estimation action at $P_{CLB}$ permits INS Output Filter and Fault Detector 114 to clear those navigation errors just prior to takeoff, reducing the residual error contributions from the INS 120 during takeoff. After the entry of the pilot estimated start point of the runway, the aircraft 250 begins to travel down the runway 230. Runway centerline estimator 210 provides a virtual centerline estimate signal output 220 from which, in one embodiment, cockpit display 170 illustrates a visual indication of the virtual runway centerline 235 from the viewpoint of the pilot. Determining the degree to which the aircraft 250 tracks the centerline 235 during a takeoff is described with respect to FIG. 3.

Figure 3:
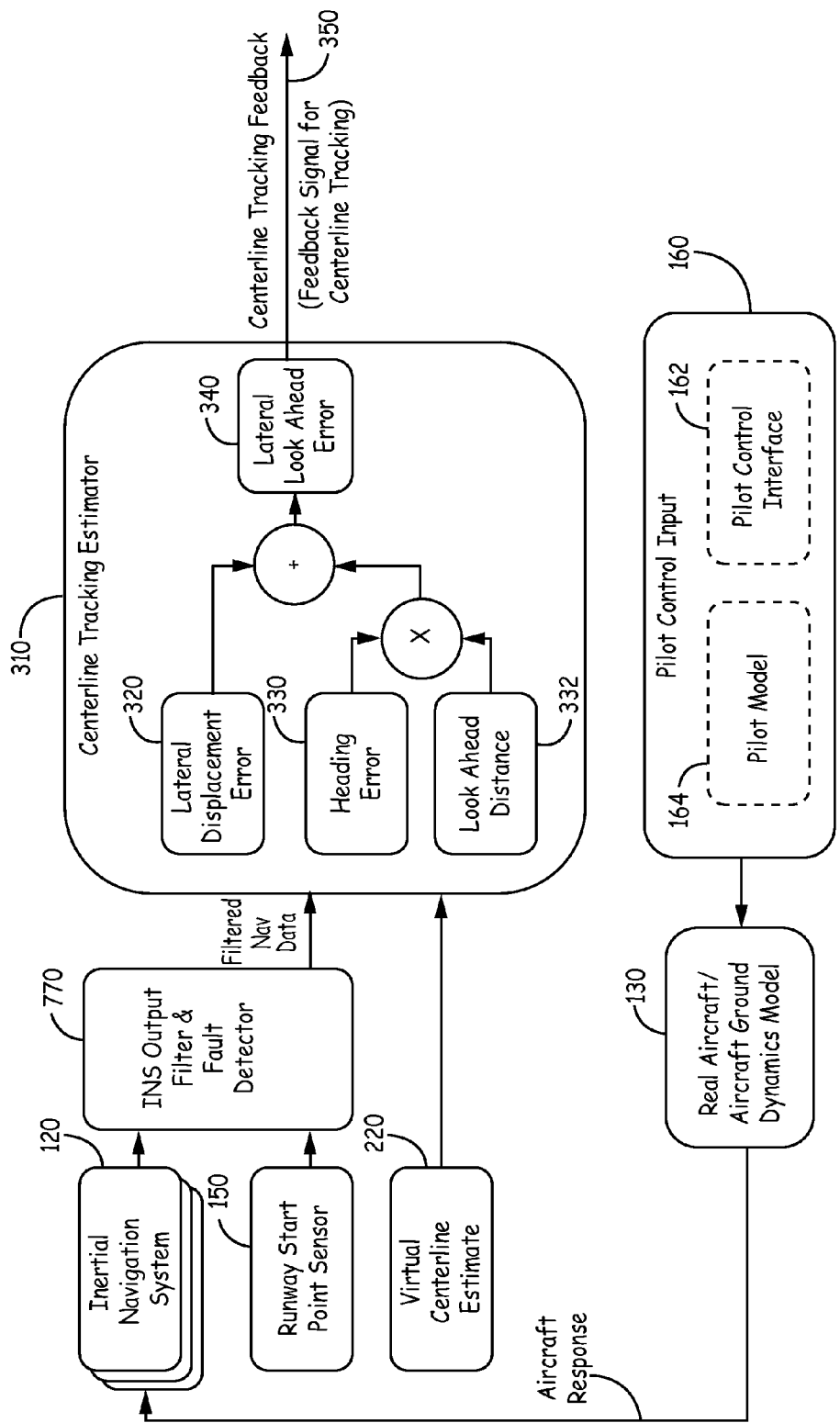
FIG. 3 is a block diagram illustrating a centerline tracking estimator of one embodiment of the present invention.

FIG. 3 is a diagram illustrating a centerline tracking estimator 310 of one embodiment of the present invention such as centerline tracking estimator 112 implemented by takeoff assistance processor 110. In one embodiment, centerline tracking estimator 310 maps the virtual runway centerline 235 into the frame of reference of aircraft 250 (for example, based on motion measurements of aircraft 250 by INS 120 as filtered by INS Output Filter and Fault Detector 770). One embodiment of INS Output Filter and Fault Detector 770 is described in more detail below with respect to FIG. 7A. Centerline tracking estimator 310 further tracks any lateral displacement error in the position of aircraft 250 with respect to the virtual runway centerline 235. That is, as the aircraft 250 travels down the runway 230, centerline tracking estimator 310 determines how accurately the pilot is tracking the virtual runway centerline 235. In one embodiment, this determination is made based on calculating a look-ahead point from the present lateral displacement error of aircraft 250, heading errors, and a pre-determined look-ahead distance. In one embodiment, centerline tracking estimator 310 further outputs a centerline tracking feedback signal (350) (or, a lateral steering command error signal) that may be used to assist the pilot in tracking the virtual runway centerline 235 as explained below.

Figure 4:
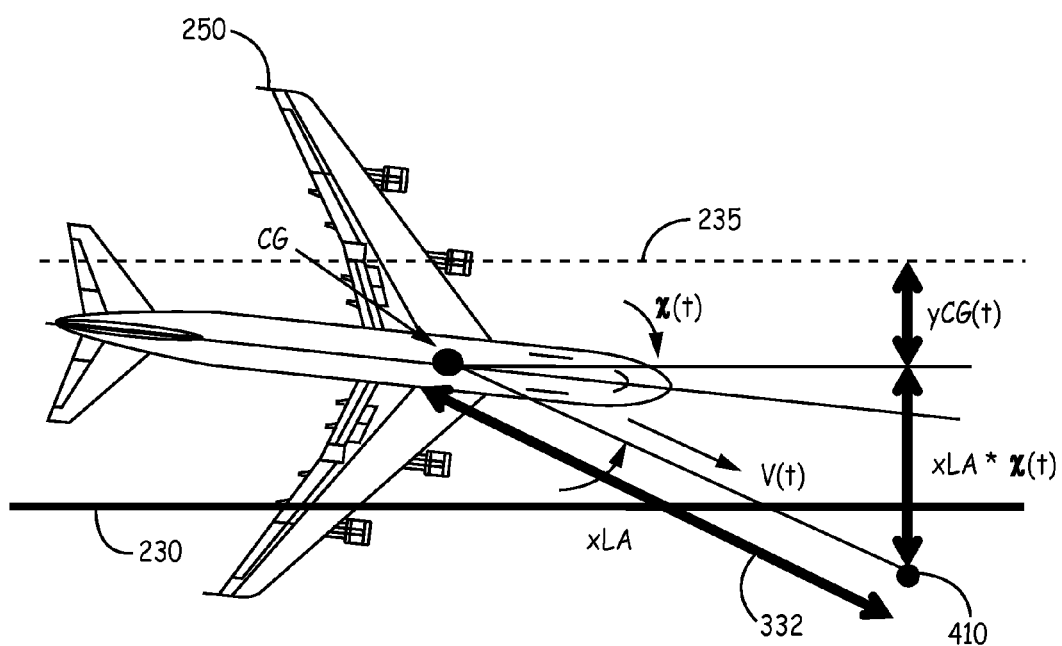
FIG. 4 is a diagram illustrating aircraft lateral deviation errors for one embodiment of the present invention.

For example, referring to FIG. 4, in one embodiment centerline tracking estimator 310 estimates a look-ahead point 410. Look-ahead point 410 provides a projection of where aircraft 250 will be at a future point in time if the pilot's present control inputs are maintained. In one embodiment, the look-ahead point 410 is located at a predetermined look-ahead distance 332 in front of the aircraft (shown as xLA in FIG. 4). A lateral displacement error 320 is determined by centerline tracking estimator 310 (shown in FIG. 4 as yCG(t)) and represents a first component of lateral displacement between the center of gravity (CG) of aircraft 250 and the virtual runway centerline 235 at time (t) attributable to the present lateral displacement of aircraft 250 from virtual runway centerline 235. The heading error 330 at the look ahead distance 332 as determined by centerline tracking estimator 310 (shown in FIG. 4 as xLA*χ(t)) represents a second error component affecting the tracking of the virtual runway centerline 235 by the center of gravity (CG) of aircraft 250 at time (t) which results from travel of aircraft 250 at a ground track angle χ(t) with respect to the virtual runway centerline 235, and velocity (shown as V(t)), and the distance to the look-ahead point (shown as xLA). A total lateral look-ahead error 340 can be calculated from $$yLAerr(t)=yCG(t)+xLA*\sin(\chi(t)),$$

which for a small value of the angle χ(t) can be approximated by $$yLAerr(t)=yCG(t)+xLA*\chi(t).$$

The values generated from this function may then be used to produce a centerline tracking feedback signal 350. In alternate embodiments as further described below, this centerline tracking feedback signal 350 may be used to provide visual feedback for the pilot via cockpit display 170, or may alternately be used to drive a pilot model 164 in a platform for evaluating takeoff capabilities of aircraft 250.

Figure 5A:
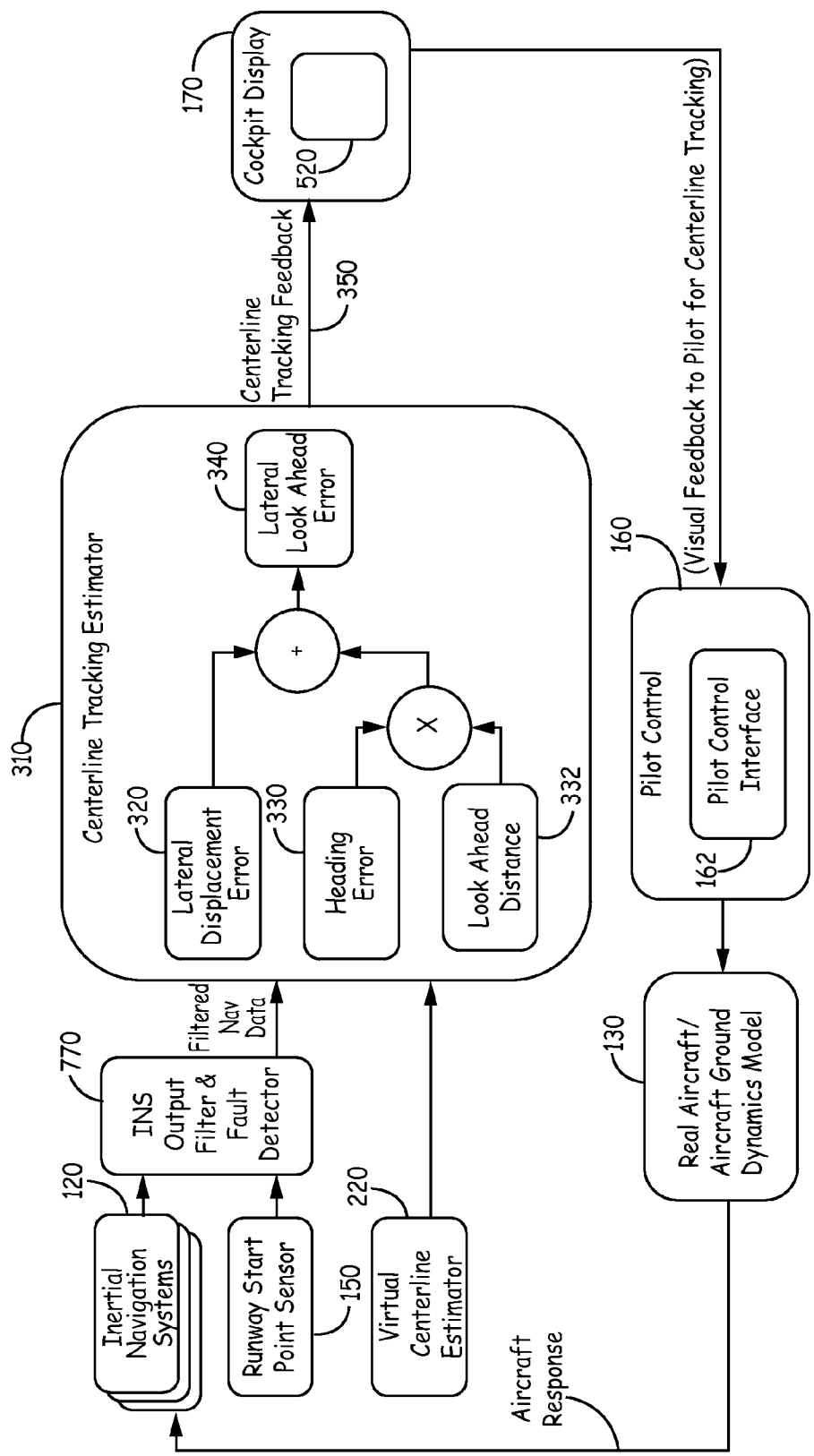
FIGS. 5A and 5B illustrate a centerline tracking estimator in combination with a cockpit display of one embodiment of the present invention.
Figure 5B:
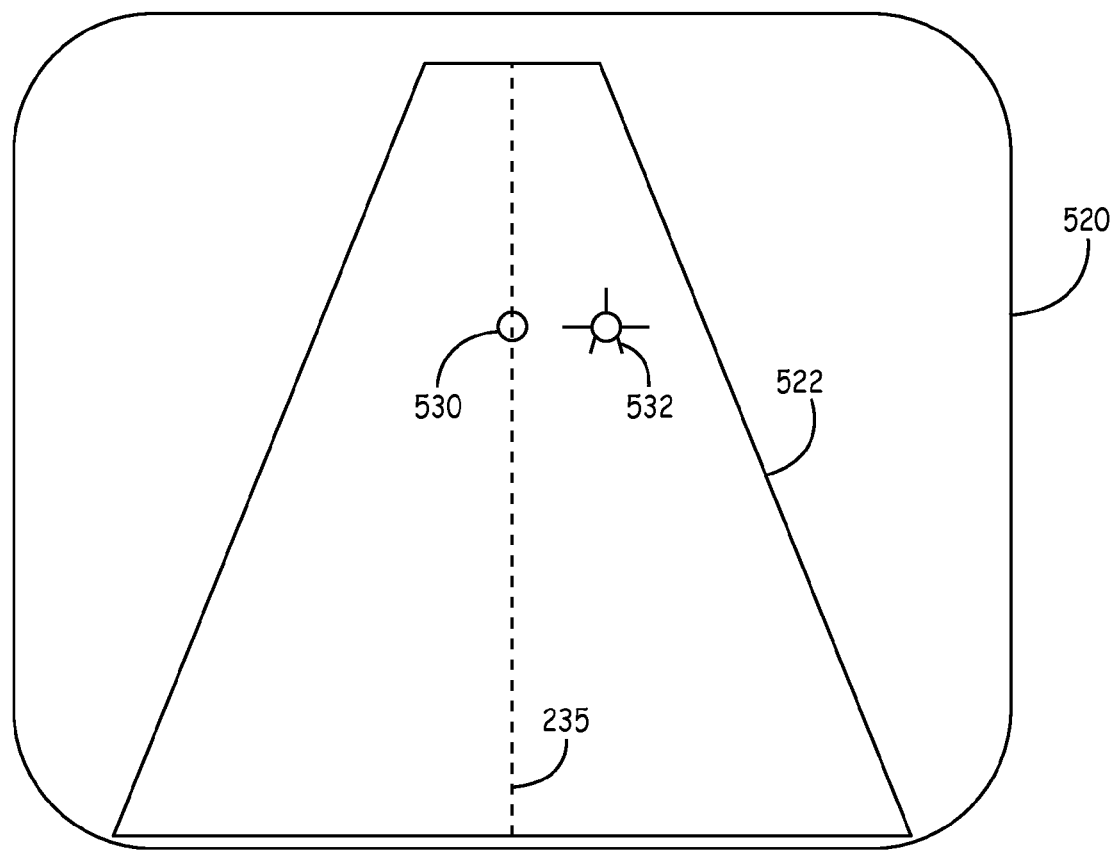

In one embodiment, as illustrated in FIGS. 5A and 5B, centerline tracking feedback signal 350 is used to drive cockpit display 170 in order to provide a pilot with a visual feedback for centerline tracking. For example, FIG. 5B illustrates a runway display 520 generated by cockpit display 170. In one embodiment, runway display 520 is provided by cockpit display 170 via a device having a screen viewable within the cockpit of aircraft 250. In other embodiment, runway display 520 is a heads-up display produced by cockpit display 170 and projected in front of the pilot so that the pilot may view visual display 520 while looking forward through cockpit windshield windows.

In one embodiment, runway display 520 comprises an illustration of the virtual runway centerline 235 which may be optionally displayed together with a runway illustration 522 that represents runway 230. In one embodiment, the data for generating virtual runway centerline 235 and/or runway illustration 522 is provided by runway centerline estimator 210 via virtual centerline estimate output 220. Also illustrated in runway display 520 are tracking symbology shown at 530 and 532. In one embodiment, a look-ahead symbol 532 (also known as ground path vector symbol) visually displays to the pilot the look-ahead point 410 determined by centerline tracking estimator 310. The displayed distance between look-ahead symbol 532 and the virtual runway centerline 235 depicts an estimate of the lateral deviation between the center of gravity of aircraft 250 and the virtual runway centerline 235 when aircraft 250 reaches that point on runway 230. Target symbol 530 (also known as the ground roll reference symbol) visually displays a point on runway illustration 522 that the pilot should direct aircraft 250 to in order to reduce and/or eliminate that lateral deviation. That is, in order to track virtual runway centerline 235, the pilot will observe runway display 520 while manipulating the controls of the pilot interface device 162 in order to cause the look-ahead symbol 532 and target symbol 530 to overlap. The pilot will try to visually align symbols 530 and 532 while steering the aircraft down the runway to place the two symbols together to cover each other. That tells him he is steering the aircraft over the right guidance point to stay on the centerline of the runway. Under the pilot's control, aircraft 250 will track the virtual runway centerline 235, and thus approximately track runway 230's actual centerline, during takeoff.

In one embodiment, the placement of one or both of look-ahead symbol 532 and target symbol 530 are augmented using a prediction of aircraft 250's response to pilot inputs as determined by aircraft ground dynamics model 130. FIG. 6 is an illustrative example of data for one such aircraft ground dynamics model 130 where aircraft 250 is a 747-100. Aircraft ground dynamics model 130 predicts how aircraft 250 will actually respond to the pilot's control inputs. For example, if target symbol 530 were statically fixed to virtual runway centerline 235, then the pilot's attempt to aim at target symbol 530 might cause an overshoot of centerline 235 requiring further correction in the opposite direction. Accordingly, in one embodiment, the position of the target symbol 530 may be placed off of the centerline 235 to guide the pilot to a more asymptotic approach and convergence with centerline 235. This helps minimize overshoot and sustained nuisance oscillation that might lead to unacceptable pilot workload. In one embodiment, using aircraft ground dynamics model 130, centerline tracking estimator 310 applies aircraft 250's current position, velocity and weight, as well as the pilot's control inputs and calculates one or more reference targets on runway 230 for the pilot to navigate to in order to bring aircraft 250 into alignment with the virtual runway centerline 235. For one such embodiment, target symbol 530 is positioned on runway display 520 based on those one or more reference targets.

In order to ensure a successful takeoff, established criteria are in place that dictate, for example, the maximum deviation an aircraft can have from a runway centerline at the moment of takeoff. As would be appreciate by one of ordinary skill in the art upon reading this specification, the virtual runway centerline 235 is an estimate based on sensor measurements and runway data that inherently will contain some degree of error. Further, pilot supplied inputs, such as the runway centerline visual alignment estimate, and steering commands during takeoff, also introduce error. Each of these errors can contribute to the magnitude of lateral deviation between the aircraft and the actual runway centerline. With embodiments of the present invention, such errors are bounded to ensure that lateral deviations will be within the established criteria.

Figure 7:
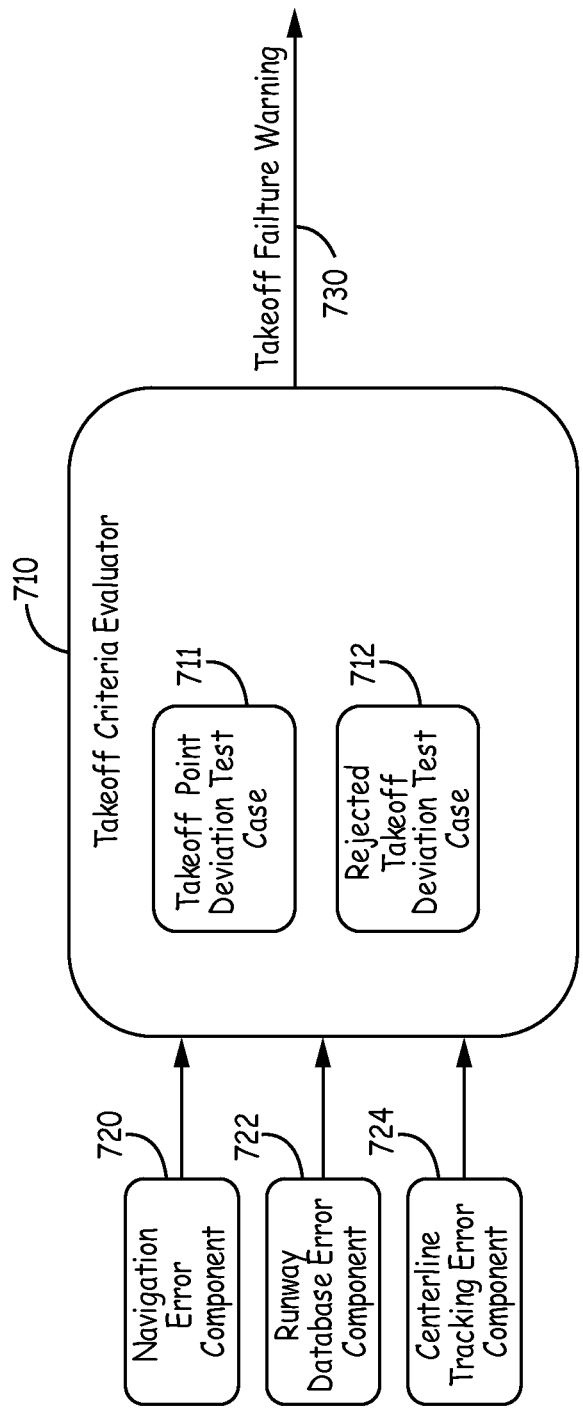
FIGS. 7 and 7A, 7B are diagrams illustrating a takeoff criteria evaluator of one embodiment of the present invention.

FIG. 7 is a diagram illustrating a takeoff criteria evaluator 710 of one embodiment of the present invention such as takeoff criteria evaluator 113 implemented by takeoff assistance processor 110. Inputs to takeoff criteria evaluator 710 include a navigation error component 720, a runway database error component 722 and a centerline tracking error component 724. The navigation error component 720 may be derived based on the known accuracies of the gyroscopes and accelerometers that comprise 120. This component may further include an estimate of error remaining from the taxi maneuver to the runway, and estimation error from the pilot's visual alignment of aircraft 250 with the runway 230 centerline. The runway database error component 722 is derived based on the accuracy and/or resolution of the runway coordinate data available via runway database 140. This would include, for example, errors in the latitude, longitude and altitude data of points representing the two ends of the runway 230. These two components contribute to the error in the virtual runway centerline 235 that the pilot is expected to track.

The centerline tracking error component 724 is derived by estimating how accurately the pilot can track the centerline 235 and correct for the deviation presented by the centerline tracking feedback. In one embodiment, the centerline tracking error component 724 incorporates error estimates calculated from the aircraft ground dynamics model 130 as well as pilot model 164, which models the pilot's reactions and abilities given the runway visibility. For example, if an aircraft begins one meter left of the runway center line, it will take a few seconds for the pilot to maneuver the aircraft back onto the centerline. This is a source of error both in the pilot response time and the dynamic response of the aircraft to pilot commands.

Given these three error components, takeoff criteria evaluator 710 determines a worst case total error from the sum of the three error components that will avoid violating the established takeoff deviation criteria. If the worst case total error exceeds the established takeoff deviation criteria, then takeoff cannot be permitted and should be rejected. For example, in one implementation government regulations establish that for an aircraft to be allowed to take off, it must meet two separate takeoff acceptance criteria. The first criteria is referred to as the maximum takeoff deviation criteria, and the second criteria is referred to as the maximum rejected takeoff deviation criteria.

Accordingly, in one implementation, takeoff criteria evaluator may run a takeoff point deviation test case 711. The maximum takeoff deviation criteria may require aircraft 250 to be within a lateral deviation of seven meters (for example) of the runway centerline at the moment the aircraft becomes airborne and leaves the runway. Takeoff criteria evaluator 710 may determine that the worst case error contributed from navigation error is +/−3 meters from the centerline, and the worst case error contribution from the runway database is +/−1 meter. Therefore, any error contributed by pilot tracking actions must be less than +/−3 meters for takeoff to be permitted. When takeoff criteria evaluator 710 determines that it is within the pilot's ability to control the aircraft to track the virtual runway centerline within +/−3 meters (given the ground dynamics of the aircraft in reaction to pilot commands), the total lateral deviation when the aircraft takes-off should be within the 7 meter criteria at the time of takeoff. Takeoff for that configuration and under those conditions can be permitted assuming that other criteria are not violated. Otherwise, takeoff criteria evaluator 710 generates an exceeded criteria indication signal 730 that warns of a takeoff centerline tracking failure.

As another example, the takeoff criteria evaluator 710 runs a rejected takeoff point deviation test case 712. The maximum rejected takeoff deviation criteria may require aircraft 250 to come to rest on the runway within a specified deviation of fourteen meters (for example) of the runway centerline for a rejected (i.e. aborted) takeoff attempt. Takeoff criteria evaluator 710 may determine that the worst case error contributed from navigation error is +/−3 meters from the centerline, and the worst case error contribution from the runway database is +/−1 meter. Then, the error contributed by pilot tracking actions must be less then +/−10 meters for takeoff to be permitted. When takeoff criteria evaluator 710 determines that it is within the pilot's ability to control the aircraft to a stop on the runaway within +/−10 meters of the virtual runway centerline (given the ground dynamics of the aircraft in reaction to pilot commands), then the rejected takeoff deviation criteria is met and takeoff for that configuration and under those conditions is permitted assuming other criteria are not violated. Otherwise, takeoff criteria evaluator 710 again generates an exceeded criteria indication signal 730 that indicates a takeoff centerline tracking failure.

Figure 7A:
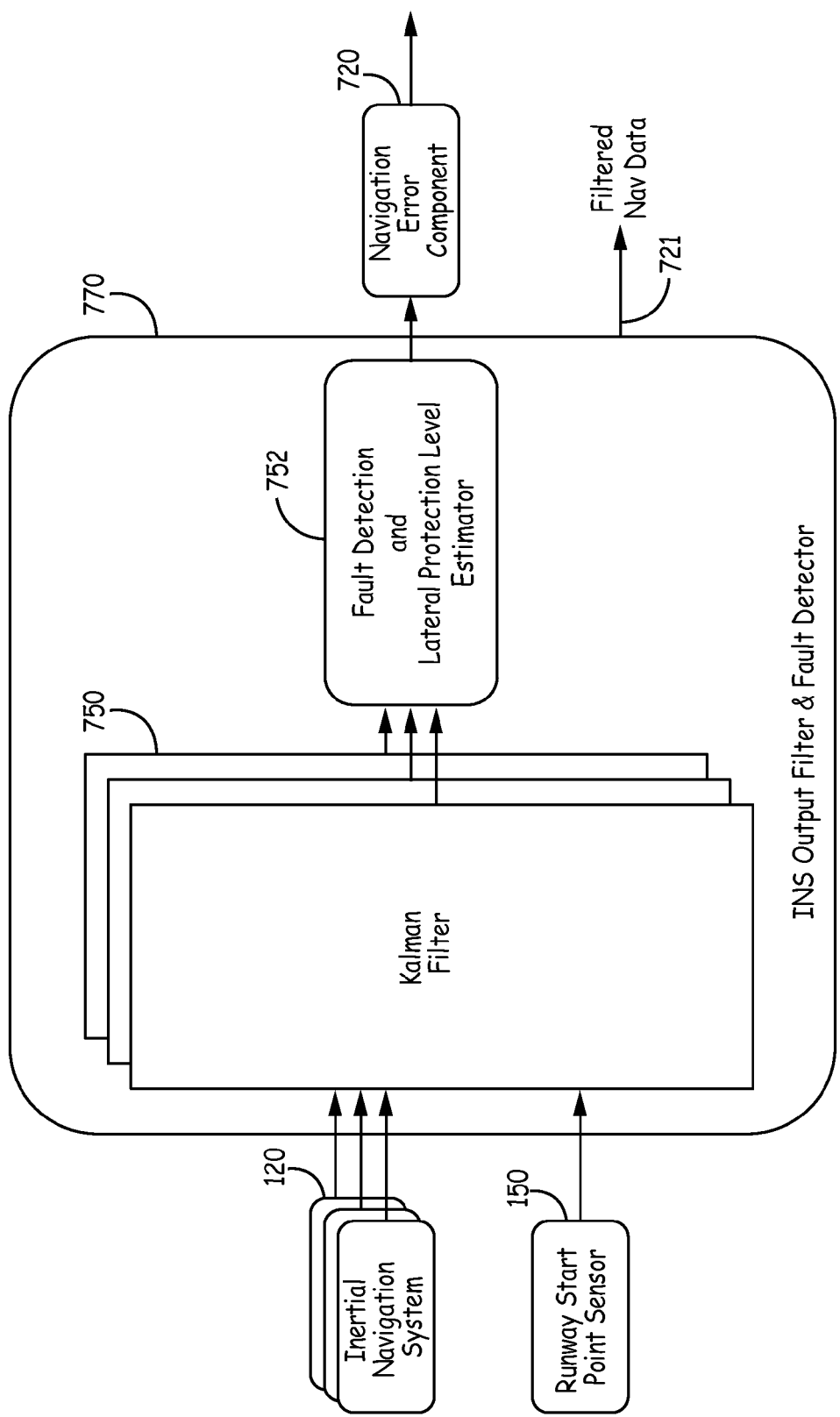

FIG. 7A is a diagram illustrating one embodiment of INS Output Filter and Fault Detector 770 as used in the systems of FIGS. 3 and 5 above. In one or more embodiments, INS Output Filter and Fault Detector 770 may be used to filter navigation measurements from an on-board inertial navigation system 120, using an estimate of the runway start point by the pilot. In one or more embodiments it may also be used with takeoff criteria evaluator 710. As illustrated in FIG. 7A, one or more Kalman filters 750 input sensor data (such as from INSs 120) and in conjunction with Fault Detection and Lateral Protection Level Estimator 752, estimates error component 720 used by takeoff criteria evaluator 113 for executing test cases 711 and 712. In one embodiment, Kalman filters 750 receive the raw data generated by the one or more inertial navigation systems 120 and runway start point sensor 150 (for centerline estimation). In one embodiment, one of the Kalman filters 750 is utilized for each of INSs 120 to estimate the inertial errors, especially attitude and heading errors, prior to the takeoff roll. The Kalman filters 750 will each propagate the error states and their associated error covariance matrix throughout the taxi of the aircraft from the gate to the runway. These error states can be estimated when the aircraft is stopped by processing a series of zero velocity measurements over several seconds and an optional position measurement. The more turns and the longer the distance covered during the taxi procedure, the better the estimation—especially of heading. For some embodiments, the pilot may initiate this estimation process when the aircraft is on the runway centerline just prior to take-off. In this case, a position measurement should be included and precisely known. Other locations may be used as well for velocity measurements, which will further improve the estimation. In one embodiment, a main position solution used for guidance is determined from the average position solution of those determined by the Kalman filters 750. To assure integrity of the lateral position, in one embodiment, Fault Detection and Lateral Protection Level Estimator 752 compares a lateral component of the main solution to each of N sub-solutions (that is, from each of N Kalman Filters 750) in which the $i^{th}$ INS of INSs 120 is excluded from the $i^{th}$ sub-solution. A fault is declared by Estimator 752 in the $i^{th}$ INS 120 if its sub-solution differs from the main solution by a certain threshold. This threshold is computed from the expected variance of this solution difference based on the covariance matrices and from the allowable false alert rate. A lateral protection level is also computed that bounds the lateral error to a desired probability.

With no failures present, the lateral protection level (LPL) may be calculated by:

$$LPL_0 = K_{ff}\sigma_{err\_main} \quad (1)$$

where $k_{ff}$ is set to yield the allowed probability based on the integrity requirement for the operation assuming a Gaussian distribution and $\sigma_{err\_main}$ is the lateral (cross-runway) position error sigma of the main solution. Given that the lateral position error of each of the N INS 120 solutions is zero mean with variance $\sigma_x^2$, the lateral position error sigma of the main solution is $$\sigma_{err\_main} = \sqrt{\frac{\sigma_x^2}{N}} \quad (2)$$

Failure detection can be accomplished by comparing the lateral separation of the main solution from each of the N sub-solutions to the following detection threshold $$D = K_{fd}\sigma_d \quad (3)$$

where $k_{fd}$ is set to yield the allowed probability of false alert assuming a Gaussian distribution (and N chances for a false detection, one for each sub-solution) and $\sigma_d$ is the sigma of the lateral separation and can be shown to equal the following $$\sigma_d = \sqrt{\frac{\sigma_x^2}{N(N-1)}} \quad (4)$$

If we assume there is a failure just under the detection threshold D, the LPL for this faulted case is $$LPL_1 = D + K_{md}\sigma_{err\_sub} \quad (5)$$

$$= K_{fd}\sigma_d + K_{md}\sigma_{err\_sub}$$

where $K_{mod}$ is set to give a missed detection probability that (when combined with the undetected inertial failure rate and exposure time) yields an overall undetected failure rate that meets the integrity requirement for that phase of the operation and $\sigma_{err\_sub}$ is the sigma of the lateral position error of each sub-solution and is given by $$\sigma_{err\_sub} = \sqrt{\frac{\sigma_x^2}{N-1}} \quad (6)$$

Figure 7B:
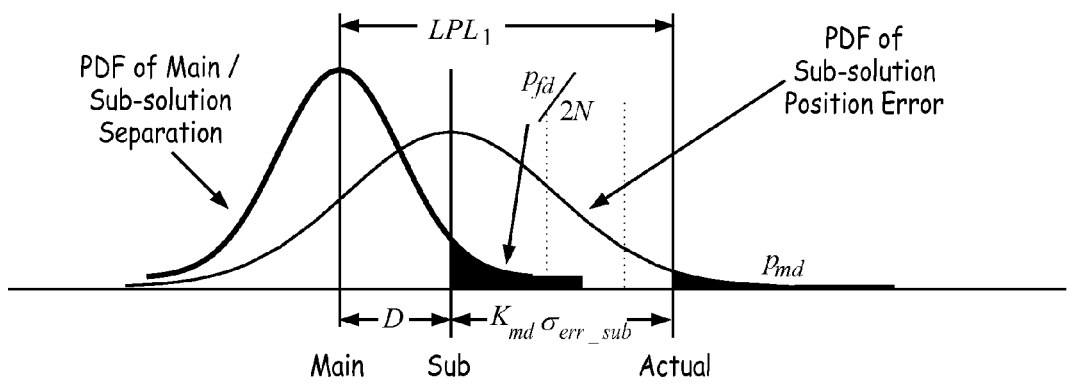

FIG. 7B illustrates the LPL calculation and probability density function (PDF) for the faulted case. The overall LPL is the larger of the two LPL cases—faulted and unfaulted. In other words $$LPL = \max(LPL_0, LPL_1) \quad (7)$$

If N≥3, then the faulted INS 120 can be isolated as it will be the one with the largest separation from the main solution. In this case, the faulty INS 120 can be removed from each of the solutions and a new LPL computed based on one fewer INS 120. If N=2, no isolation is possible as both separations will be the same.

Figure 8:
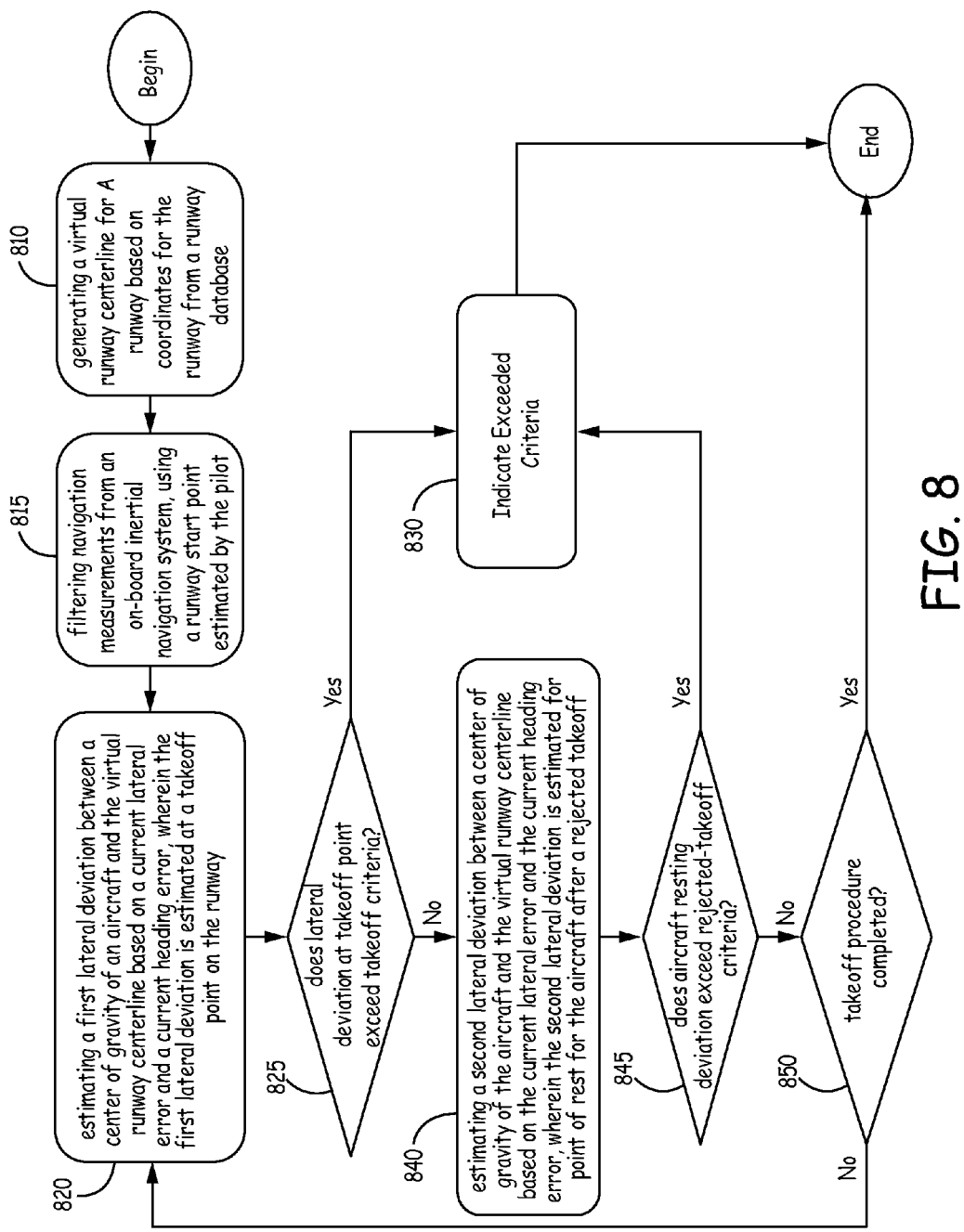
FIG. 8 is a flow chart illustrating a method of one embodiment of the present invention.

FIG. 8 is a flow chart illustrating one method of one embodiment of the present invention for evaluating the takeoff capability of an aircraft assisted by an on-board generated virtual runway centerline. This method may be implemented in combinations with any of the other embodiments described herein. For example, this method may be used for implementing the various embodiments of centerline takeoff assist system 100 or takeoff evaluation platform 900. The method begins at 810 with generating a virtual runway centerline for a runway based on coordinates for the runway from a runway database. In one embodiment, this virtual runway centerline may be generated in as described with respect to runway centerline estimator 210. In one embodiment, a method of INS Output Filter and Fault Detector is used at 815 wherein the filtering and assessing the fault status of onboard sensors occurs, The INS Output Filter and Fault Detector filters navigation measurements from an on-board inertial navigation system, using the pilot entry to the runway start point sensor. The method proceeds to 820 with estimating a first lateral deviation between a center of gravity of an aircraft and the virtual runway centerline based on a current lateral displacement error and a current heading error, wherein the first lateral deviation is estimated at a takeoff point on the runway. In one embodiment, the INS error components and fault status are calculated using a INS Output Filter and Fault Detector such as discussed above with respect to FIG. 7A. When the first lateral deviation exceeds a takeoff deviation criteria (checked at 825), the method proceeds to 830 with generating an indication of an exceeded takeoff deviation criteria. Otherwise, the method proceeds to 840 with estimating a second lateral deviation between a center of gravity of the aircraft and the virtual runway centerline based on the current lateral error and the current heading error, wherein the second lateral deviation is estimated for point of rest for the aircraft after a rejected takeoff. When the second lateral deviation exceeds a rejected takeoff deviation criteria (checked at 845), the method again proceeds to 830 with generating an indication of an exceeded rejected takeoff deviation criteria. In some embodiments (as shown at 850), the method returns to block 820 to repeat the process throughout the takeoff maneuver. The method may also return to repeat block 810 to provide an updated virtual runway centerline estimate.

In one embodiment estimating one or both of the first lateral deviation and the second lateral deviations is based on an estimated navigation error component, a runway database error component, and a lateral deviation error component. Further, the lateral deviations may be determined by generating a centerline tracking feedback signal that varies as a function of a difference between an aircraft look-ahead point and the virtual runway centerline, wherein the aircraft look-ahead point is determined at least in part from aircraft dynamics as predicted by an Aircraft Ground Dynamics Model. As discussed with respect to FIG. 5B, in one embodiment, the method may further comprise generating a display within a cockpit of the aircraft, wherein the display provides a visual deviation between a target symbol and a look-ahead symbol based on the virtual runway centerline and the centerline tracking feedback signal. The look-ahead symbol may be generated based on an aircraft look-ahead point determined at least in part from pilot control inputs.

Still other embodiments of the present invention are drawn to platforms for pre-testing and certifying aircraft equipment for use on runways under reduced visual range conditions without assistance from external navigation signals. Certification of an aircraft will show that the aircraft's onboard equipment and runway database data is accurate enough to generate a virtual centerline which a pilot can successfully follow. For example, an aircraft can be certified to one of a plurality of available runway visible range limits, such as 300 ft, 600 ft and 1200 ft. Measurements of the runway visual range are routinely taken at airports and available to pilots and Air Traffic Control (ATC). In one implementation, the ATC controller at the airport will only let planes with equipment certified for takeoff under the present runway visual range conditions to taxi out and take off. Certification of aircraft equipped with a virtual centerline takeoff assist system (such as system 100 above) will allow aircraft departing from airports to go out and take off at reduced visibility based on their certification level without assistance from an ILS or other external source of navigation information. The certification of the aircraft will indicate to the ATC controller that the equipment onboard the aircraft is accurate enough for the pilot to follow the on-board generated virtual runway centerline during takeoff from that airport for a runway visible range greater than or equal to the aircraft's certification level.

Figure 9:
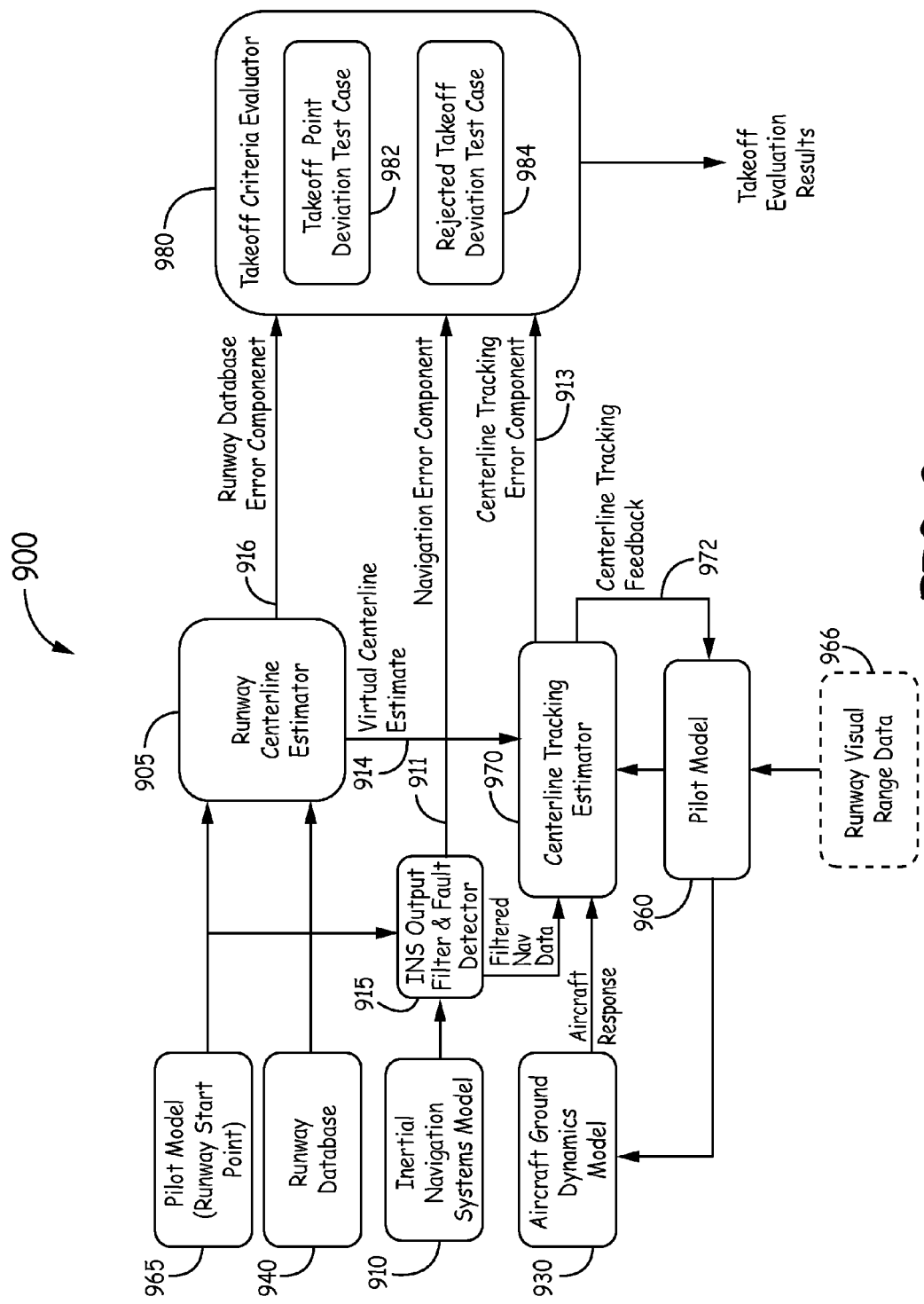
FIG. 9 is a diagram illustrating a takeoff evaluation platform of one embodiment of the present invention.

Accordingly, FIG. 9 is a block diagram illustrating a takeoff evaluation platform 900 of one embodiment of the present invention. Takeoff evaluation platform 900 comprises a runway centerline estimator 905, a centerline tracking estimator 970, and a takeoff criteria evaluator 980, which function in an analogous manner to the respective runway centerline estimator 210, centerline tracking estimator 310, and takeoff criteria evaluator 710 described above. The essential difference between virtual centerline takeoff assist system 100 and takeoff evaluation platform 900 is that takeoff evaluation platform 900 utilizes test models to represent all sensor inputs from on-board aircraft sensors, including pilot inputs.

Accordingly, runway centerline estimator 905 processes data generated from an inertial navigation systems model 910 (as processed by INS Output Filter and Fault Detector 915), and a runway database 940. Pilot model 960 simulates the Runway Start Point Sensor 150 discussed above with respect to FIGS. 1, 2C, 3 and 7A for aligning the aircraft with the actual centerline at the beginning of the runway as perceived by a pilot. Inertial navigation systems model 910 simulates the inertial sensor measurement signals (such as from inertial navigation system 120) that would be generated due to aircraft movements and accelerations. The runway database 940 provides the pertinent runway dimensions and coordinates as discussed above with respect to runway database 140. Based on these inputs, runway centerline estimator 905 outputs a virtual centerline estimate (shown at 914) to the centerline tracking estimator 970.

Centerline tracking estimator 970 includes inputs from an aircraft ground dynamics model 930 and a pilot model 960 to generate centerline tracking feedback 972. The aircraft ground dynamics model 930 provides the same functions as Aircraft Dynamics Model 130 above, to predict how an aircraft will actually respond to the pilot control inputs given the various physical parameters (such as shown in FIG. 6, for example) that define the dynamic behavior of the aircraft. Pilot model 960 provides the same function as pilot model 164, simulating a pilot's efforts to drive the error represented by the centerline tracking feedback 972 to zero by controlling the movement of the aircraft. That is, pilot model 960 simulates the neuro-muscular dynamics of a human pilot observing a sensory input (e.g. visual or auditory signals) and attempting to control that input through hand and/or arm movements. The pilot model 960, in some embodiments, may be augmented by runway visual range data 966, which tunes the pilot model 960 to account for reduced visual data available to the pilot under reduced runway visual range conditions. As would be appreciated by one of ordinary skill in the art upon reading this description, models 910, 930, 960 and 965 are shown as independent elements for illustration purposes but in alternate implementations may be integrated or otherwise interconnected to exchange data to perform their respective functions.

In the embodiment shown in FIG. 9, INS Output Filter and Fault Detector 915 is coupled to the inertial navigation systems model 910 and based on data from this component allocates error prediction in the form of a navigation error component 911. In one embodiment, INS Output Filter and Fault Detector 915 receives the raw data generated by one or more of inertial navigation system model 910 and pilot model 965 for the pilot indicated runway start point.

Takeoff Criteria Evaluator 980 receives the navigation error component 911, centerline tracking error component 913 and the runway database error component 916 and evaluates the worst case contribution of these errors to the lateral deviation between the aircraft and the actual runway centerline. With this information, an appropriate aircraft reduced visual range certification for an aircraft may be established by determining the conditions where worst case lateral deviation is bounded within the established criteria.

For example, in one implementation, once takeoff evaluation platform 900 has established estimates for the error components 911, 913 and 916, takeoff criteria evaluator 980 executed one or more test cases to determine if the aircraft being simulated can successfully take off or not. In one embodiment, a first test case determines whether the aircraft configuration under test will pass a maximum takeoff deviation criteria, such as discussed above with respect to FIG. 7. A second test case determines whether the aircraft configuration under test will pass a maximum rejected takeoff deviation criteria, such as discussed above with respect to FIG. 7.

For example, in one implementation, takeoff criteria evaluator 980 runs a takeoff point deviation test case (shown at 982), which combines the worst case error contributed from navigation error, the worst case error contribution from the virtual centerline estimate, and the worst case error contribution from centerline tracking. The Takeoff Criteria Evaluator 980 determines whether it is within the pilot's ability, given the ground dynamics of the aircraft in reaction to pilot commands, to control the aircraft to track the virtual runway centerline and be within the maximum takeoff deviation criteria at the time of takeoff. Alternatively, takeoff criteria evaluator 980 may calculate the degree of pilot accuracy necessary to meet the maximum takeoff deviation criteria, and takeoff evaluation platform 900 recursively calculates the minimum runway visibility range for which the pilot model is able to achieve the required accuracy.

In one embodiment, takeoff criteria evaluator 980 further runs a maximum rejected takeoff deviation test case (shown at 984), which also combines the worst case error contributed from navigation error, the worst case error contribution from the runway database and the worst case error contribution from centerline tracking. For this test case, the Takeoff Criteria Evaluator 980 determines whether it is within the pilot's ability, given the ground dynamics of the aircraft in reaction to pilot commands, to control the aircraft to track the virtual runway centerline for a rejected takeoff attempt and be within the maximum rejected takeoff deviation criteria when aircraft comes to a rest. Alternatively, takeoff criteria evaluator 980 may calculate the degree of pilot accuracy necessary to meet the maximum rejected takeoff deviation criteria, and takeoff evaluation platform 900 recursively calculates the minimum runway visibility range for which the pilot model is able to achieve the required accuracy.

Example Embodiments

Example 1 includes a takeoff ground roll assist system for an aircraft, the system comprising: a runway centerline estimator, wherein the runway centerline estimator generates a virtual runway centerline estimate for a runway based on coordinates for the runway from a runway database; an (Inertial Navigation System) INS Output Filter and Fault Detector wherein the filtering of navigation measurements from an on-board inertial navigation system, using a runway centerline start point as established by activation of a pilot operated start point sensor occurs, a centerline tracking estimator coupled to receive a filtered output of the on-board inertial navigation system from the INS output filter and fault detector and to receive the virtual centerline estimate from the runway centerline estimator, wherein the centerline tracking estimator generates a centerline tracking feedback signal that varies as a function of a difference between an aircraft look-ahead point and the virtual runway centerline; and a takeoff criteria evaluator coupled to the runway centerline estimator and the centerline tracking estimator, wherein the takeoff criteria evaluator estimates a lateral deviation between the aircraft and an actual runway centerline for the runway based on an estimated navigation error component, the runway database error component, and a centerline tracking error component.

Example 2 includes the takeoff ground assist system of example 1, wherein the INS output filter and fault detector comprises one or more Kalman filters, each Kalman filter configured to estimate inertial errors in an associated on-board inertial navigation system; and a fault detection and lateral protection level estimator, coupled to the one or more Kalman filters and configured to identify faulty ones of the on-board inertial navigation system and to calculate a lateral protection level that bounds the lateral error to a selected probability.

Example 3 includes the takeoff ground assist system of any of examples 1-2, wherein the one or more Kalman filters comprises N Kalman filters, each associated with one of N on-board inertial navigation systems; each of the N Kalman filters is configured to determine a position solution; and the fault detection and lateral protection level estimator is configured to: determine a main position solution from the average position solution from the one or more Kalman filters; compare a lateral component of the main solution to each of N sub-solutions in which the ith on-board inertial navigation system is excluded from the ith sub-solution; and declaring a fault in the ith inertial navigation system if the ith sub-solution differs from the main solution by more than a selected threshold.

Example 4 includes the takeoff ground assist system of any of examples 1-3, wherein the threshold is computed from the expected variance of the comparison between the main solution and the sub-solutions based on the covariance matrices and from the allowable false alert rate according to $$D = K_{fd}\sigma_d = K_{fd}\sqrt{\frac{\sigma_x^2}{N(N-1)}}$$

where $\sigma_x^2$ is the expected variance of the lateral position error of a single position solution of a single Kalman filter and $K_{fd}$ is a sigma multiplier determined from the allowable false detection probability.

Example 5 includes the takeoff ground assist system of any of examples 1-4, wherein the fault detection and lateral protection level estimator is further configured to compute the lateral protection level according to $$LPL = \max(LPL_0, LPL_1)$$
$$= \max[\{K_{ff}\sigma_{err\_main}), (D + K_{md}\sigma_{err\_sub})]$$
$$= \max\left[\left(K_{ff}\sqrt{\frac{\sigma_x^2}{N}}\right), \left(D + K_{md}\sqrt{\frac{\sigma_x^2}{N-1}}\right)\right]$$

where $K_{ff}$ is the fault-free sigma multiplier determined from the overall integrity requirement and $K_{md}$ is the missed detection sigma multiplier determined from the allowable missed detection probability.

Example 6 includes the takeoff ground assist system of any of examples 1-5, wherein the centerline tracking estimator is further coupled to an Aircraft Ground Dynamics Model, wherein the aircraft look-ahead point is determined at least in part from aircraft dynamics as predicted by the Aircraft Ground Dynamics Model.

Example 7 includes the takeoff ground assist system of any of examples 1-6, wherein the centerline tracking estimator is further coupled to a pilot control input, wherein the aircraft look-ahead point is determined at least in part from a pilot command entered via the pilot control input, and wherein the pilot control input comprises one or both of a pilot model and a pilot control interface.

Example 8 includes the takeoff ground assist system of any of examples 1-7, wherein the centerline tracking estimator calculates the look-ahead point based on a combination of a lateral displacement error and a heading error.

Example 9 includes the takeoff ground assist system of any of examples 1-8, further comprising a cockpit display, wherein the cockpit display provides a visual deviation between a target symbol and a look-ahead symbol based on the virtual runway centerline output and the centerline tracking feedback signal, wherein the target symbol defines a point on the runway that the pilot should direct the aircraft to in order to reduce lateral deviation between the virtual runway centerline and a center of gravity of the aircraft.

Example 10 includes the takeoff ground assist system of any of examples 1-9, wherein the takeoff criteria evaluator provides a warning when the lateral deviation estimated by the takeoff criteria evaluator predicts that a maximum takeoff deviation criteria will be exceeded when the aircraft takes off or that a maximum rejected takeoff deviation criteria will be exceeded after the aircraft comes to rest from a rejected takeoff.

Example 11 includes a takeoff evaluation platform for an aircraft having a virtual runway centerline takeoff assist system, the system comprising: a runway centerline estimator, wherein the runway centerline estimator generates a virtual runway centerline estimate for a runway based on coordinates for the runway from a runway database; an Inertial Navigation System (INS) Output Filter and Fault Detector wherein filtering navigation measurements from an on-board inertial navigation system, using a runway centerline start point as established by activation of a pilot operated runway start point sensor occurs, a centerline tracking estimator coupled to receive a filtered output of the on-board inertial navigation system from the INS output filter and fault detector and to receive the virtual centerline estimate from the runway centerline estimator, wherein the centerline tracking estimator generates a centerline tracking feedback signal that varies as a function of a difference between an aircraft look-ahead point and the virtual centerline estimate; wherein the centerline tracking estimator is further coupled to an Aircraft Ground Dynamics Model, wherein the aircraft look-ahead point is determined at least in part from aircraft dynamics as predicted by the Aircraft Ground Dynamics Model; wherein the centerline tracking estimator is further coupled to a pilot model that receives the centerline tracking feedback signal, wherein the aircraft look-ahead point is determined at least in part from simulated pilot commands received via the pilot model; and a takeoff criteria evaluator coupled to the runway centerline estimator and the centerline tracking estimator, wherein the takeoff criteria evaluator estimates a lateral deviation between the aircraft center of gravity and an actual runway centerline for the runway based on an estimated navigation error component, the runway database error component, and a centerline tracking error component.

Example 12 includes the takeoff ground assist system of example 11, wherein the INS Output Filter and Fault Detector, generates an estimated navigation error component.

Example 13 includes the takeoff ground assist system of any of examples 11-12, wherein the centerline tracking estimator calculates the look-ahead point based on a combination of a lateral displacements error and a heading error.

Example 14 includes the takeoff ground assist system of any of examples 11-13, wherein the takeoff criteria evaluator executes a test case to determine when the lateral deviation estimated by the takeoff criteria evaluator predicts that that a maximum takeoff deviation criteria will be exceeded during an aircraft take off.

Example 15 includes the takeoff ground assist system of any of examples 11-14, wherein the takeoff criteria evaluator executes a test case to determine when the lateral deviation estimated by the takeoff criteria evaluator predicts that that a maximum rejected takeoff deviation criteria will be exceeded when an aircraft comes to rest from a rejected takeoff.

Example 16 includes a method for evaluating the takeoff capability of an aircraft assisted by an on-board generated virtual runway centerline, the method comprising: generating a virtual runway centerline for a runway based on coordinates for the runway from a runway database; filtering navigation measurements from an on-board inertial navigation system, using a runway centerline start point as established by activation of a pilot operated runway start point sensor, estimating a first lateral deviation between a center of gravity of an aircraft and the virtual runway centerline based on a current lateral displacement error and a current heading error, wherein the first lateral deviation is estimated at a takeoff point on the runway; when the first lateral deviation exceeds a takeoff deviation criteria, generating an indication of an exceeded takeoff deviation criteria; estimating a second lateral deviation between a center of gravity of the aircraft and the virtual runway centerline based on the current lateral displacement error and the current heading error, wherein the second lateral deviation is estimated for point of rest for the aircraft after a rejected takeoff; and when the second lateral deviation exceeds a rejected takeoff deviation criteria, generating an indication of an exceeded rejected takeoff deviation criteria.

Example 17 includes the method of examples 16 further comprising: estimating one or both of the first lateral deviation and the second lateral deviations based on an estimated navigation error component, a runway database error component, and a centerline tracking error component.

Example 18 includes the method of any of examples 16-17, further comprising: generating a centerline tracking feedback signal that varies as a function of a difference between an aircraft look-ahead point and the virtual runway centerline, wherein the aircraft look-ahead point is determined at least in part from aircraft dynamics as predicted by an Aircraft Ground Dynamics Model.

Example 19 includes the method any of examples 16-18, further comprising: generating a display within a cockpit of the aircraft, wherein the display provides a visual deviation between a target symbol and a look-ahead symbol based on the virtual runway centerline and the centerline tracking feedback signal.

Example 20 includes the method any of examples 16-19, wherein the look-ahead symbol is generated based on an aircraft look-ahead point determined at least in part from pilot control inputs.

Several means are available to implement the systems and methods of the current invention as discussed in this specification. For example, elements of the takeoff assistance processor 110 and takeoff evaluation platform 900 can be realized through discrete electronics, digital computer systems, digital signal processors, microprocessors, programmable controllers and field programmable gate arrays (FPGAs) or application-specific integrated circuits (ASICs). Therefore other embodiments of the present invention are program instructions resident on non-transient computer readable storage media which when implemented by such means enable them to implement embodiments of the present invention. Computer readable storage media are any form of a physical non-transitory computer memory storage device. Examples of such a physical computer memory device include, but is not limited to, punch cards, magnetic disks or tapes, optical data storage system, flash read only memory (ROM), non-volatile ROM, programmable ROM (PROM), erasable-programmable ROM (E-PROM), random access memory (RAM), or any other non-transitory form of permanent, semi-permanent, or temporary memory storage system or device. Program instructions include, but are not limited to computer-executable instructions executed by computer system processors and hardware description languages such as Very High Speed Integrated Circuit (VHSIC) Hardware Description Language (VHDL).

Although specific embodiments have been illustrated and described herein, it will be appreciated by those of ordinary skill in the art that any arrangement, which is calculated to achieve the same purpose, may be substituted for the specific embodiment shown. This application is intended to cover any adaptations or variations of the present invention. Therefore, it is manifestly intended that this invention be limited only by the claims and the equivalents thereof.

What is claimed is:

1. A takeoff ground roll assist system for an aircraft, the system comprising:
    a runway centerline estimator, wherein the runway centerline estimator generates a virtual centerline estimate for a runway based on coordinates for the runway from a runway database;
    an Inertial Navigation System (INS) output filter and fault detector that filters navigation measurements from an on-board inertial navigation system, using a runway centerline start point to estimate errors in the on-board inertial navigation system;
    a centerline tracking estimator coupled to receive a filtered output of the on-board inertial navigation system from the INS output filter and fault detector and to receive the virtual centerline estimate from the runway centerline estimator, wherein the centerline tracking estimator generates a centerline tracking feedback signal that varies as a function of a difference between an aircraft look-ahead point and the virtual centerline estimate; and
    a takeoff criteria evaluator coupled to the runway centerline estimator and the centerline tracking estimator, wherein the takeoff criteria evaluator estimates a lateral deviation between the aircraft center of gravity and an actual runway centerline for the runway based on an estimated navigation error component, a runway database error component, and a centerline tracking error component.

2. The system of claim 1, wherein the INS output filter and fault detector comprises:
    one or more Kalman filters, each Kalman filter configured to estimate inertial errors in an associated on-board inertial navigation system; and
    a fault detection and lateral protection level estimator, coupled to the one or more Kalman filters and configured to identify faulty ones of the on-board inertial navigation system and to calculate a lateral protection level that bounds the lateral error to a selected probability.

3. The system of claim 2, wherein:
    the one or more Kalman filters comprises N Kalman filters, each associated with one of N on-board inertial navigation systems;
    each of the N Kalman filters is configured to determine a position solution; and
    the fault detection and lateral protection level estimator is configured to:
        determine a main position solution from the average position solution from the one or more Kalman filters;
        compare a lateral component of the main solution to each of N sub-solutions in which the ith on-board inertial navigation system is excluded from the ith sub-solution; and
        declaring a fault in the ith inertial navigation system if the ith sub-solution differs from the main solution by more than a selected threshold.

4. The system of claim 3, wherein the threshold is computed from the expected variance of the comparison between the main solution and the sub-solutions based on the covariance matrices and from the allowable false alert rate according to $$D = K_{fd}\sigma_d = K_{fd}\sqrt{\frac{\sigma_x^2}{N(N-1)}}$$

where $\sigma_x^2$ is the expected variance of the lateral position error of a single position solution of a single Kalman filter and $K_{fd}$ is a sigma multiplier determined from the allowable false detection probability.

5. The system of claim 3, wherein the fault detection and lateral protection level estimator is further configured to:
    compute the lateral protection level according to $$LPL = \max(LPL_0, LPL_1)$$
$$= \max[(K_{ff}\sigma_{err\_main}), (D + K_{md}\sigma_{err\_sub})]$$
$$= \max\left[\left(K_{ff}\sqrt{\frac{\sigma_x^2}{N}}\right), \left(D + K_{md}\sqrt{\frac{\sigma_x^2}{N-1}}\right)\right]$$

where $K_{ff}$ is the fault-free sigma multiplier determined from the overall integrity requirement and $K_{md}$ is the missed detection sigma multiplier determined from the allowable missed detection probability.

6. The system of claim 1, wherein the centerline tracking estimator is further coupled to an Aircraft Ground Dynamics Model, wherein the aircraft look-ahead point is determined at least in part from aircraft dynamics as predicted by the Aircraft Ground Dynamics Model.

7. The system of claim 1, wherein the centerline tracking estimator is further coupled to a pilot control input, wherein the aircraft look-ahead point is determined at least in part from a pilot command entered via the pilot control input, and wherein the pilot control input comprises one or both of a pilot model and a pilot control interface.

8. The system of claim 1, wherein the centerline tracking estimator calculates the look-ahead point based on a combination of a lateral displacement error and a heading error.

9. The system of claim 1, further comprising a cockpit display, wherein the cockpit display provides a visual deviation between a target symbol and a look-ahead symbol based on the virtual runway centerline output and the centerline tracking feedback signal, wherein the target symbol defines a point on the runway that the pilot should direct the aircraft to in order to reduce lateral deviation between the virtual runway centerline and a center of gravity of the aircraft.

10. The system of claim 1, wherein the takeoff criteria evaluator provides a warning when the lateral deviation estimated by the takeoff criteria evaluator predicts that a maximum takeoff deviation criteria will be exceeded when the aircraft takes off or that a maximum rejected takeoff deviation criteria will be exceeded after the aircraft comes to rest from a rejected takeoff.

11. A takeoff evaluation platform for an aircraft having a virtual runway centerline takeoff assist system, the system comprising:
    a runway centerline estimator, wherein the runway centerline estimator generates a virtual runway centerline estimate for a runway based on coordinates for the runway from a runway database;

an (inertial navigation system) INS output filter and fault detector that filters navigation measurements from an on-board inertial navigation system, using a runway centerline start point to estimate errors in the on-board inertial navigation system;

a centerline tracking estimator coupled to receive a filtered output of the on-board inertial navigation system from the INS output filter and fault detector and to receive the virtual centerline estimate from the runway centerline estimator, wherein the centerline tracking estimator generates a centerline tracking feedback signal that varies as a function of a difference between an aircraft look-ahead point and the virtual centerline estimate;

wherein the centerline tracking estimator is further coupled to an Aircraft Ground Dynamics Model, wherein the aircraft look-ahead point is determined at least in part from aircraft dynamics as predicted by the Aircraft Ground Dynamics Model;

wherein the centerline tracking estimator is further coupled to a pilot model that receives the centerline tracking feedback signal, wherein the aircraft look-ahead point is determined at least in part from simulated pilot commands received via the pilot model; and a takeoff criteria evaluator coupled to the runway centerline estimator and the centerline tracking estimator, wherein the takeoff criteria evaluator estimates a lateral deviation between the aircraft center of gravity and an actual runway centerline for the runway based on an estimated navigation error component, the runway database error component, and a centerline tracking error component.

12. The system of claim 11, and further comprising a runway start point sensor that is adapted to be activated by a pilot to establish the runway centerline start point.

13. The system of claim 11, wherein the centerline tracking estimator calculates the look-ahead point based on a combination of a lateral displacement error and a heading error.

14. The system of claim 11, wherein the takeoff criteria evaluator executes a test case to determine when the lateral deviation estimated by the takeoff criteria evaluator predicts that that a maximum takeoff deviation criteria will be exceeded during an aircraft take off.

15. The system of claim 11, wherein the takeoff criteria evaluator executes a test case to determine when the lateral deviation estimated by the takeoff criteria evaluator predicts that that a maximum rejected takeoff deviation criteria will be exceeded when an aircraft comes to rest from a rejected takeoff.

16. A method for evaluating the takeoff capability of an aircraft assisted by an on-board generated virtual runway centerline, the method comprising:

generating a virtual runway centerline for a runway based on coordinates for the runway from a runway database;

filtering navigation measurements from an on-board inertial navigation system, using a runway centerline start point to estimate errors in the on-board inertial navigation system;

estimating a first lateral deviation between a center of gravity of an aircraft and the virtual runway centerline based on a current lateral displacement error and a current heading error, wherein the first lateral deviation is estimated at a takeoff point on the runway;

when the first lateral deviation exceeds a takeoff deviation criteria, generating an indication of an exceeded takeoff deviation criteria;

estimating a second lateral deviation between a center of gravity of the aircraft and the virtual runway centerline based on the current lateral displacement error and the current heading error, wherein the second lateral deviation is estimated for point of rest for the aircraft after a rejected takeoff; and when the second lateral deviation exceeds a rejected takeoff deviation criteria, generating an indication of an exceeded rejected takeoff deviation criteria.

17. The method of claim 16 further comprising:
estimating one or both of the first lateral deviation and the second lateral deviations based on an estimated navigation error component, a runway database error component, and a centerline tracking error component.

18. The method of claim 16, further comprising:
generating a centerline tracking feedback signal that varies as a function of a difference between an aircraft look-ahead point and the virtual runway centerline, wherein the aircraft look-ahead point is determined at least in part from aircraft dynamics as predicted by an Aircraft Ground Dynamics Model.

19. The method of claim 18, further comprising:
generating a display within a cockpit of the aircraft, wherein the display provides a visual deviation between a target symbol and a look-ahead symbol based on the virtual runway centerline and the centerline tracking feedback signal.

20. The method of claim 16, wherein the look-ahead symbol is generated based on an aircraft look-ahead point determined at least in part from pilot control inputs.

* * * * *